Aug. 27, 1968  T. C. WALDROP  3,398,655
MOLDED BASE SWAB CUP
Filed Dec. 15, 1966

INVENTOR
TOM C. WALDROP

BY *Alexander & Dowell*

ATTORNEYS

United States Patent Office 3,398,655
Patented Aug. 27, 1968

3,398,655
MOLDED BASE SWAB CUP
Tom C. Waldrop, Forth Worth, Tex., assignor to Royal Industries, Inc., a corporation of Texas
Filed Dec. 15, 1966, Ser. No. 602,078
8 Claims. (Cl. 92—241)

ABSTRACT OF THE DISCLOSURE

A reinforced swab cup having a rubber body with axially disposed reinforcing elements embedded therearound, the lower ends of the reinforcing elements being encapsulated in a semi-rigid plastic material, such as nylon, hard rubber, etc., and the lower ends of the reinforcing elements being radially confined by a ring about which the elements and their encapsulating material are outwardly pivotal through a small increment. In addition, the method of making such a cup including the step of first forming an intermediate reinforcing structure comprising the encapsulating base and reinforcing elements, and the subsequent step of molding the rubber body thereabout.

The invention

The present invention relates to improvements in both the structure of reinforced swab cups and in the technique of their manufacture.

One of the difficulties most frequently recurring in the manufacture of resilient swab cups, especially of the type having longitudinal metal reinforcements pivotally confined at their lower ends, stems from the fact that the pivoting of the lower ends of the elements is usually accomplished by a very loose fit between the elements and their pivotal engagement with the base, the latter generally having holes or slots into which wire reinforcing elements are loosely fitted. These elements are generally pre-assembled with the base to form a cage-like structure, which is then embedded in molded rubber, which is cured to complete the cup. The problem is how to hold the base and loosely engaged wires in a desired mutual configuration while the rubber is being applied and cured. This invention solves the problem by encapsulation of this engagement in a material which is flexible enough to permit the small degree of pivoting motion which must be performed by the wires while spreading into contact with the tubing walls, but which material must be rigid enough to maintain the desired alignment of elements during manufacture, and also rigid enough to stabilize the seating of the cup upon a swab mandrel shoulder to prevent such seating from becoming tilted off axis.

A cup having its reinforcement members captivated in a molded semi-rigid base member at their lower ends also provides a superior product from the utility point of view, not only because it is lighter and more resistant to corrosive and electrolytic phenomena, but because the plastic base can be shaped to cooperate with the reinforcement wires and the body in such a way as to provide improved support for the rubber body itself. It is well known that one of the worst wear areas of the rubber is concentrated in a zone near the outside periphery of the cup just above its base, and is the result of cold flow of rubber out between the reinforcing elements under high-pressure loading and the resulting wearing away of the flowed rubber against the tubing walls. The prior art teaches many types of annular fabric or plastic reinforcements in this zone, but on a practical basis these reinforcements are difficult to apply around the wires and to position properly during molding of the rubber body to the reinforcing cage and base.

It is an object of this invention to provide a swab cup having a novel pivotal reinforcing-cage structure including a base assembly which is strong enough to permit molding thereof from a semi-rigid material which encapsulates all the joints of the cage, and which material can also be formed to include a tapering molded apron extending above and integral with the base and surrounding the reinforcing elements to help them support the rubber in the lower portion of the cup against the aforesaid bulging of the rubber. The semi-rigid apron flexes outwardly with the wires and the adjacent base material.

Another object of this invention is to teach the use of new materials for the base of a reinforced swab cup, including plastics such as nylon, and including hardened blends of rubber such as Phenolic Hycar rubbers, Hycar being a trade name for acrylanitryl additives which are the most oil resistant of presently known resins. Such hardened rubbers may advantageously include fibers milled into the blend, for instance short glass fibers. Pure phenolics, such as phenol formaldehydes, also provide good base structures and have the advantage of bonding especially well to the rubber body material.

Other objects and advantages of the present invention will become apparent during the following discussion of the drawings, wherein.

Figure 1:
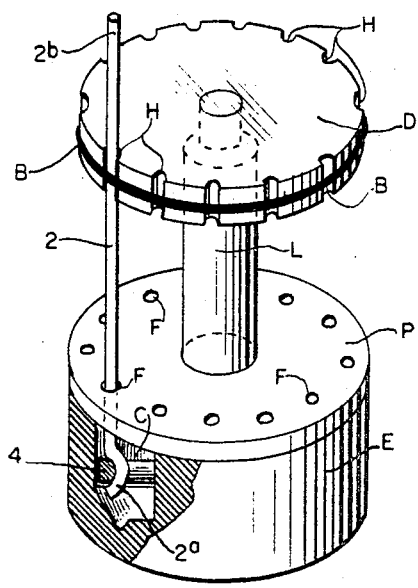
FIG. 1 is a view of a mold and jig for making an intermediate reinforcing cage which includes reinforcement elements encapsulated in a molded base.

Referring now to the drawings, FIG. 1 shows a jig and mold assembly which is useful in carrying out the present process wherein an intermediate cup-reinforcement cage is initially fabricated, the cage including reinforcing elements 2 having their lower ends banded by a ring 4 and encapsulated in a molded base member 3, various modifications of this combination being shown in FIGS. 2 through 6. The preliminary fabrication of such an intermediate cage structure, as mentioned above, greatly facilitates the subsequent molding of a rubber body 1a about the reinforcement cage because the individual wires forming the latter are thereby all oriented and fixed with respect to each other as well as to the intended axis of the finished swab cup during molding and curing of the rubber. Especially where the reinforcing elements 2 are made of circular cross-section wire, it has been very difficult to position the wires during molding and curing of the rubber body thereto so that all of the hooked lower ends, such as the ends 2a, are outwardly disposed and lie in radial planes. The present method of manufacture solves this problem by accurately holding the upper portions 2b of the wires while encapsulating their lower ends 2a, and then subsequently molding the rubber body 1a around the upper portion of the resulting cage while the reinforcing elements 2 are being held securely at their lower ends by the applied encapsulation.

FIG. 1 shows a three-piece jig and mold assembly including a disc D having wire holding grooves H around its periphery for positioning the wires 2 in mutually parallel relationship, and having a band B for clamping the wires in the grooves. The mold includes a cover plate P having a locating stud L extending upwardly from its surface to engage and center the disc D with respect to the plate P. This plate overlies and closes the cavity C of the lower mold member E, the illustrated cavity shape being suitable for molding the base member 3 shown in FIG. 2. The reinforcing elements 2 are first inserted upwardly through snug holes F in the plate P and are held in the grooves H by the band B, the ring 4 being properly positioned on the hooked members 2a during such assembly. Then the mold member E is closed upon the plate P, and the encapsulating plastic is pumped into the cavity C through sprue openings (not shown). When a base 3 has been molded in the cavity and cooled, the resulting cage assembly is removed by first removing the mold member E and then pulling the wires 2 downwardly from the grooves H and then through the holes F in the plate P. The inward bend of the upper ends 2b of the wires, as illustrated in FIG. 2, can be provided after the encapsulation operation described above has been completed.

Figure 2:
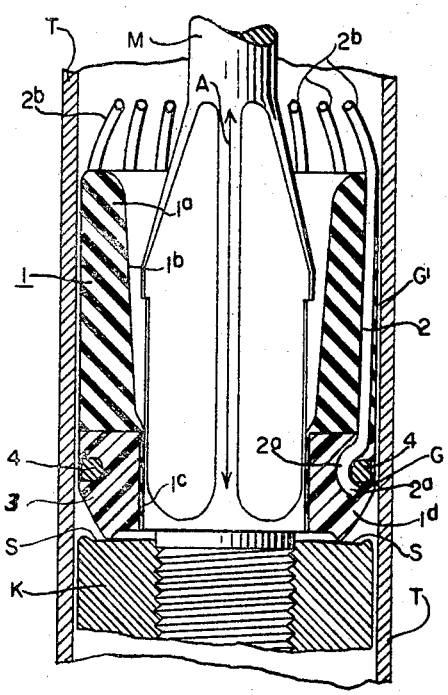
FIG. 2 is a longitudinal sectional view taken through a cup made according to the present invention and showing the cup supported on a mandrel within a length of well tubing, the cup being illustrated almost in relaxed condition.

FIG. 2 shows a finished cup made according to the present invention, the cup being located within tubing T and mounted upon a mandrel M of conventional design. The lower end of the mandrel M is threaded and screwed into a coupling K which provides a shoulder S upon which the swab cup seals when it is lifting a fluid column, all of these parts being well known in the prior art. The mandrel and shoulder thus support the swab cup 1 which comprises a rubber body 1a having an upper bore 1b located above a smaller bore 1c, the cup being annular in cross-section. Near the lower end 1d of the cup is the annular base 3 serving to receive and locate the lower ends of the plurality of metal reinforcing elements 2. These elements are shown as wire members having their arc-shaped or hooked lower ends 2a embedded in the base 3. In view of the fact that most of the forces sustained by the reinforcing elements 2 during high pressure operation are directed radially outwardly, the hooked ends of the wire elements are banded and radially confined by a surrounding annular member 4, preferably comprising a continuous metal ring. The upper ends 2b of the reinforcing elements 2 are bent inwardly after completion of the encapsulating step, as set forth above, so as to prevent them from snagging in joints of the tubing being swabbed by the cup.

As illustrated in FIG. 2, the cup is almost in relaxed condition within the tubing. When fully relaxed, the reinforcing elements 2 and the rubber body 1a lie substantially parallel to the tubing walls and are slightly spaced therefrom by a gap G. On the other hand, when the mandrel M is raised in the tubing, the cup spreads outwardly against its surface so that a part of the semi-rigid base member 3, the wires 2 and the rubber body 1a spread toward the tubing walls to effect a seal which axially elongates as the loading increases by progressively reducing the gap G'.

It is the use of plastic encapsulation to form a base member which makes it possible to realize the benefits of the present manufacturing process by which the wires are positively located and held in the desired locations at the time the rubber body 1a is being applied to the cup. Likewise, it is the annular banding effect provided by the rigid ring 4 which makes it attractive to use plastics instead of metals to form a base member. Prior art cup bases which lacked a banding ring 4 usually could be made strong enough only by employing a metal base member. Such a base member, itself, had to support the outward and downward forces applied to it by the wires 2, and thus a base member had to be made of extra strong material in order to provide adequate support.

Figure 3:
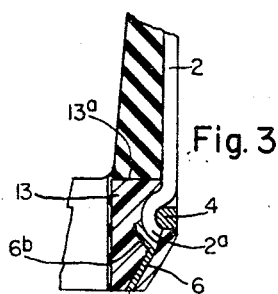
FIG. 3 is a fragmentary sectional view through a first modified form of the cup having a reinforcing insert molded into its base.

FIG. 3 shows a first modification of the invention in which an annular metal insert 6 is added to the encapsulating base member 13 in order to accomplish the following improvements. First, it is very important that the base of the cup provide a highly stable and non-yielding engagement with the shoulder S to ensure that the cup will not cock on the mandrel M, but will be supported in a true axial position thereby. If the encapsulating material 13 of which the base member is made has a considerable degree of resilience, then the stability of the base when seated on the mandrel shoulder S might not be adequate. The addition of the metal insert 6 provides an additional annular seating surface 6a which is substantially incompressible. Second, the insert 6 also has an upper portion 6b which supports the lower ends 2a of the reinforcing elements 2 while at the same time providing an arcuate surface against which the curved lower ends of the elements can pivot through small increments.

Figure 4:
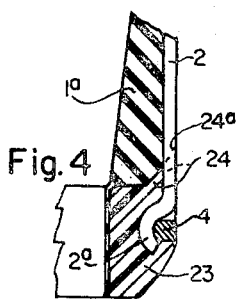
FIG. 4 is a fragmentary sectional view showing a second modified form of cup having an apron tapering outwardly above the base to confine the lower portion of the rubber body against outward buldging.

FIG. 4 shows a second modified form of the cup including a semi-rigid base member 23 of adequate hardness to support the cup upon the shoulder S. This modified form shows an outwardly tapered apron 24 in which the wires 2 are embedded and which flows around the contours of the wires and then tapers upwardly to a very thin tip 24a between them. This apron portion 24 provides a desirable degree of confinement for the rubber in the lower portion of the body 1a to help it resist bulging out between the wires in the vicinity to the upper surface of the base member, as would occur in FIG. 3 above the surface 13a. This idea of confining the rubber above the base is broadly known in the prior art, but the present structure has the great advantage of the fact that apron 24 is integral with the base 23, unlike most prior art structures, and is flexible enough so that it can expand with the wires to engage the tubing T.

Figure 5:
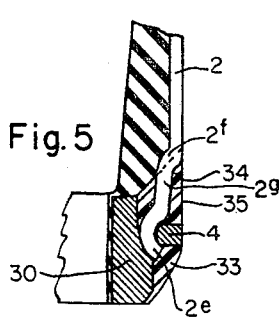
FIG. 5 is a fragmentary sectional view through a cup showing a third modified form of the invention including a base made partly of encapsulating material applied to an annular metal member and including an apron member molded integrally with the encapsulated material.

FIG. 5 shows a further modified structure in which the reinforcement elements 2 have hooked lower ends 2e and also have another bend 2f serving to recess the portion of the wire 2g inwardly from the peripheral surface 35. The base illustrated in FIG. 5 is somewhat like the base illustrated in FIG. 4, at least to the extent of including an apron 34 which is integrally molded together with the portion 33 of the base. The base has a general exterior shape similar to the base 23 including a plastic portion 33, although as shown in FIG. 5 the base also includes a metal portion 30 which serves a purpose similar to the insert 6 shown in FIG. 3. At any rate, it is an object of the structure shown in FIG. 5 to recess the portions 2g of the wires 2 entirely within the plastic apron 34 so that a long transitional edge between the plastic of the apron and the metallic wire is not presented on the outside surface of each wire in the vicinity of the apron as would be the case in the structure shown in FIG. 4.

Figure 6:
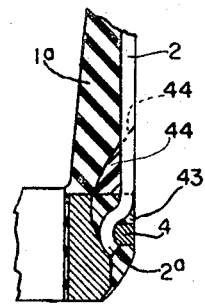
FIG. 6 is a view similar to FIG. 5, wherein the apron is a separate insert.

FIG. 6 shows a further modified form similar to FIG. 5 but wherein the apron 44 is separate from the encapsulating base portion 42, and comprises a tapered ring with axially extending peripheral recesses in its outer surface so that it can straddle each of the wires 2. Since according to this invention the wires 2 and the ring 4 are encapsulated in the material 43 of FIG. 6, it is then an easy matter to slide the apron ring 44 into the reinforcement cage just prior to molding of the rubber body 1a to form the complete cup.

It will be noted that in all of the forms of the present invention the encapsulating material substantially completely surrounds the lower ends 2a of the wires and supports them in a semi-rigid manner both against rotation about the axis of the wire which would cause the hooked ends of the portion 2a to improperly engage the ring 4, and also against tipping of the longitudinal portions 2 of the wires out of parallel alignment with the axis A of the cup as shown in FIG. 2. Furthermore, the fact that the encapsulating material is only semi-rigid permits the material in the base to completely enclose the pivotal engagement without binding its action since the plastic material can flex with the motions of the wires during loading and unloading of the cup.

The present invention is not to be limited to the exact form shown in the drawings, for obviously changes may be made within the scope of the following claims.

I claim:
1. The method of making a swab cup having an upper and a lower end and having a resilient body with an annular series of circumferentially spaced longitudinal reinforcing elements embedded in the body including the steps of:
   (a) assembling the reinforcing elements and supporting them above their lower ends in their desired mutual relationship;
   (b) molding an annular semi-rigid member around and joining the lower ends of the reinforcing elements thereby encapsulating corresponding incremental portions of their lengths together to form a base member uniting the reinforcing elements into a unitary self-supporting reinforcing cage; and
   (c) subsequently molding the resilient body about the upper ends of the reinforcing element of the cage and in contact with said base member to form the swab cup.
2. In a cup as set forth in claim 8, each of said reinforcing elements having a hook in its lower end opening radially outwardly with respect to the cup; and said ring means engaging and radially confining said hooked lower ends.
3. In a cup as set forth in claim 8, the lower ends of said reinforcing elements terminating within said semi-rigid material; and an annular insert of rigid material in said base member extending to the bottom thereof to provide a rigid cup supporting surface and extending upwardly into contact with the lower ends of the reinforcing elements to increase their vertical support within the base.
4. In a cup as set forth in claim 8, the resilient body being disposed above the base, and the body and reinforcing elements being substantially tangent with the outer surface of the cup over most of its length, and said semi-rigid base material having an integrally-formed upwardly-extending annular apron having an inner surface in contact with the body and tapering upwardly and outwardly the apron being located outside of the lowermost portion of the resilient body to confine the latter and reduce its tendency to bulge out between the reinforcing elements.
5. In a cup as set forth in claim 4, the outer surface of the apron and of the base being flush with the outer surface of the cup.
6. In a cup as set forth in claim 4, the reinforcing elements being tangent with the outer surface of the cup opposite the body and above the apron, but being recessed radially inwardly from the outer surface in the vicinity of the apron and of the base.
7. In a cup as set forth in claim 8, the resilient body being disposed above the base, and the body and reinforcing elements being susbtantially tangent with the outer surface of the cup over most of the length of the body, a semi-rigid annular member resting upon the base from above and having an outer surface flush with the outer surface of the cup and provided with an annular series of axially disposed recesses to receive and pass said elements, and said annular member being thickest at its lower end and having an inner surface contacting the body and tapering outwardly to terminate part-way up the body.
8. A reinforced swab cup, comprising:
   (a) an annular resilient body having an upper end and a lower end and having an axial bore therethrough;
   (b) a unitary self-supporting cage assembly comprising a plurality of separate and independent reinforcing elements axially embedded in said body and circumferentially spaced therearound, said reinforcing elements having lower ends extending below said resilient body; rigid ring means surrounding the reinforcing elements and located between their lower ends and the lower end of the resilient body and concentric with said axial bore; and an annular base member of formed semi-rigid material disposed against the lower end of said resilient body and surrounding and encapsulating said ring means and the lower ends of said reinforcing elements.

References Cited

UNITED STATES PATENTS

| | | | |
|---|---|---|---|
| 1,548,580 | 8/1925 | Christenson | 92—241 |
| 1,613,066 | 1/1927 | Turner | 92—241 |
| 1,786,012 | 12/1930 | Guiberson | 92—241 |
| 2,069,212 | 2/1937 | Buffington | 92—241 |
| 2,216,291 | 10/1940 | Caldwell | 92—241 |
| 2,330,563 | 9/1943 | Duvall | 277—227 X |
| 2,624,603 | 1/1953 | Sweet | 227—227 X |
| 2,862,776 | 12/1958 | Bowerman | 92—241 |
| 2,917,352 | 12/1959 | Taylor | 92—241 |
| 3,062,601 | 11/1962 | Sadler | 92—240 |
| 3,081,136 | 3/1963 | Waldrop | 92—241 |

MARTIN P. SCHWADRON, *Primary Examiner.*

G. N. BAUM, *Assistant Examiner.*